(12) United States Patent
Millstone et al.

(10) Patent No.: US 10,173,265 B2
(45) Date of Patent: Jan. 8, 2019

(54) METHOD FOR PRODUCING SMALL METAL ALLOY NANOPARTICLES

(71) Applicant: UNIVERSITY OF PITTSBURGH—OF THE COMMONWEALTH SYSTEM OF HIGHER EDUCATION, Pittsburgh, PA (US)

(72) Inventors: Jill Erin Millstone, Pittsburgh, PA (US); Christopher Michael Andolina, Pittsburgh, PA (US); Andrew Craik Dewar, Pittsburgh, PA (US)

(73) Assignee: University of Pittsburgh—Of the Commonwealth System of Higher Education, Pittsburgh, PA (US)

(*) Notice: Subject to any disclaimer, the term of this patent is extended or adjusted under 35 U.S.C. 154(b) by 457 days.

(21) Appl. No.: 14/778,480

(22) PCT Filed: Mar. 24, 2014

(86) PCT No.: PCT/US2014/031623
§ 371 (c)(1),
(2) Date: Sep. 18, 2015

(87) PCT Pub. No.: WO2014/153563
PCT Pub. Date: Sep. 25, 2014

(65) Prior Publication Data
US 2016/0288212 A1   Oct. 6, 2016

(51) Int. Cl.
*B22F 9/24*     (2006.01)
*B82B 1/00*     (2006.01)
(Continued)

(52) U.S. Cl.
CPC .............. *B22F 9/24* (2013.01); *B22F 1/0018* (2013.01); *B82B 1/008* (2013.01); *C22C 5/02* (2013.01);
(Continued)

(58) Field of Classification Search
None
See application file for complete search history.

(56) References Cited

U.S. PATENT DOCUMENTS 7,335,245 B2 * 2/2008 He ..................... B22F 1/0018
75/351
2004/0038506 A1 * 2/2004 Kataoka ............... B22F 1/0022
438/584

(Continued)

FOREIGN PATENT DOCUMENTS

WO   WO-2013/128458 A1 * 9/2013

*Primary Examiner* — George P Wyszomierski
(74) *Attorney, Agent, or Firm* — Paul D. Bangor, Jr., Esq.; Clark Hill PLC

(57) ABSTRACT

A method for producing small metal alloy nanoparticles of a first metal and a second metal, comprising: mixing, at room temperature in air, a first aqueous solution of first and second metal nanoparticle precursor species in a first molar ratio of the first metal to the second metal; mixing a separate organic ligand into the first aqueous solution; adding a reducing agent to the first aqueous solution; and aging the first aqueous solution for a first period. The method may further comprise characterizing by photoluminescence or other property the metal alloy nanoparticles from the first aqueous solution and/or from a second aqueous solution of first and second metal nanoparticle precursor species in a second molar ratio of the first metal to the second metal.

14 Claims, 16 Drawing Sheets

(51) Int. Cl.
*B22F 1/00* (2006.01)
*C22C 5/02* (2006.01)
*C22C 9/00* (2006.01)
*B82B 3/00* (2006.01)

(52) U.S. Cl.
CPC .......... *C22C 9/00* (2013.01); *B22F 2009/245* (2013.01); *B22F 2301/10* (2013.01); *B22F 2301/255* (2013.01); *B22F 2304/054* (2013.01); *B22F 2998/10* (2013.01); *B82B 3/0095* (2013.01); *Y10S 977/84* (2013.01)

(56) References Cited

U.S. PATENT DOCUMENTS

| | | | | |
|---|---|---|---|---|
| 2004/0247924 A1* | 12/2004 | Andres | | B03C 1/00 |
| | | | | 428/546 |
| 2006/0178260 A1* | 8/2006 | Zhong | | B22F 9/24 |
| | | | | 502/185 |
| 2008/0081017 A1* | 4/2008 | Zhou | | B01J 23/44 |
| | | | | 423/584 |
| 2010/0101637 A1* | 4/2010 | Yamasaki | | B22F 1/0022 |
| | | | | 136/252 |
| 2015/0183028 A1* | 7/2015 | Bhagavatula | | B82Y 30/00 |
| | | | | 75/362 |

* cited by examiner

Initial reaction conditions for $Au_xCu_yNP$ synthesis    Table 1

| Cu (%) | 20.0 mM $Au^{3+}$ (µL) | 20.0 mM $Cu^{2+}$ (µL) |
|---|---|---|
| 0 | 188 | 0 |
| 20 | 150 | 38 |
| 40 | 113 | 75 |
| 50 | 94 | 94 |
| 60 | 75 | 113 |
| 80 | 38 | 150 |
| 100 | 0 | 188 |

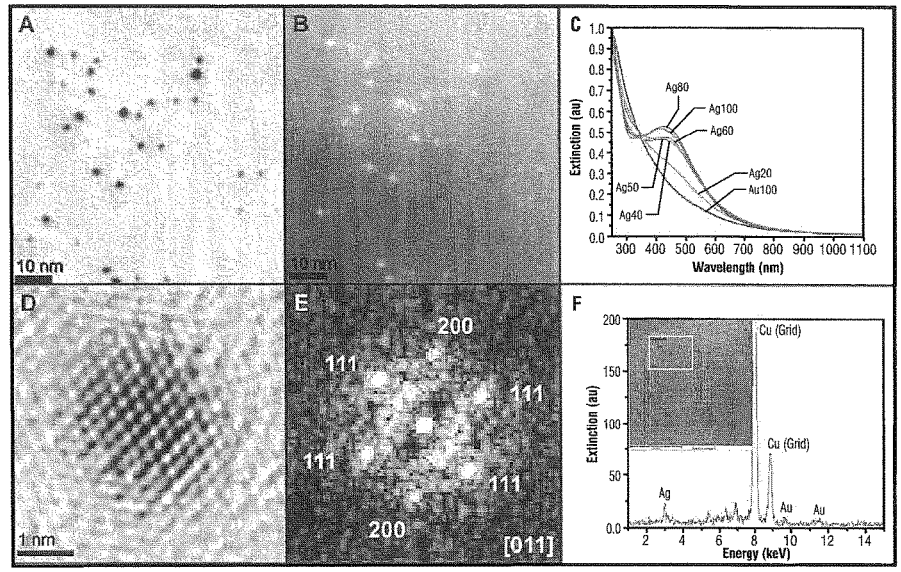

*Fig.3*

Size, composition and photoluminescence analysis of Au$_x$Cu$_y$NP$_s$    Table 2

| Initial Molar % Cu | Lattice Constant HRTEM (Å) | NP Composition EDS (% Cu) | NP Composition ICP-MS (% Cu) | NP Size TEM (nm) | NP Size PFGSE-NMR (nm) | ε at 360 nm (x10$^5$ M$^{-1}$cm$^{-1}$) | λ$_{EM}$ (nm) | Full-Width at Half Maximum (nm) | Φ (x 10$^{-4}$) | Brightness (M$^{-1}$cm$^{-1}$) |
|---|---|---|---|---|---|---|---|---|---|---|
| 0 | 3.96±0.12 | 0 | 0 | 2.2±0.5 | 4.7±0.3 | 15.9 | 948±9 | 256±10 | 1.9±0.2 | 302 |
| 20 | 3.99±0.13 | 33±3 | 3±4 | 1.9±0.3 | 5.1±0.8 | 5.08 | 947±4 | 246±4 | 25±4 | 1270 |
| 40 | 3.70±0.08 | 53±5 | 20±16 | 3.0±0.5 | 4.6±0.9 | 19.3 | 966±9 | 250±1 | 17±4 | 3281 |
| 50 | 3.96±0.07 | 48±13 | 44±15 | 3.0±0.8 | 4.6±0.3 | 13.6 | 1004±25 | 253±8 | 8.6±0.3 | 1170 |
| 60 | 3.66±0.13 | 56±14 | 50±11 | 2.6±0.6 | 4.4±0.9 | 10.2 | 1058±8 | 262±16 | 4.6±1.0 | 469 |
| 80 | 3.88±0.16 | 62±8 | 74±10 | 2.8±0.5 | 4.4±0.9 | 8.62 | 1067±7 | 265±17 | 1.9±0.4 | 164 |
| 100 | 4.33±0.10 | 100 | 98±3 | 2.8±0.9 | 4.8±0.2 | 3.45 | NA | NA | NA | NA |

All values reported in Table 1 are reported as an average with associated standard deviation (see SI for details of each experiment), unless indicated otherwise. Molar extinction coefficients (ε) and brightness (ε · Φ) were calculated from average measured values. NA indicates that the values could not be measured and/or calculated. Standard deviation of the mean are reported for the emission maxima (λ$_{EM}$), FWHM and quantum yield (Φ).

*Fig.4*

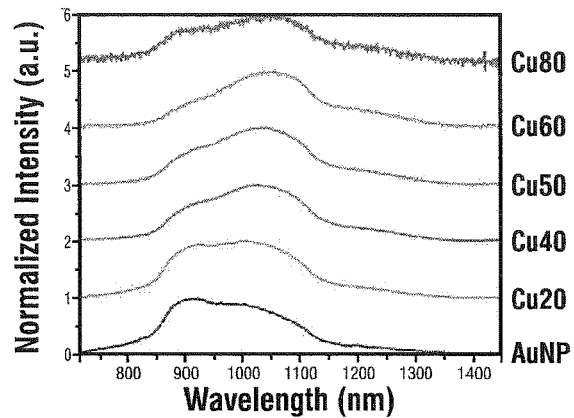
*Fig.16A*
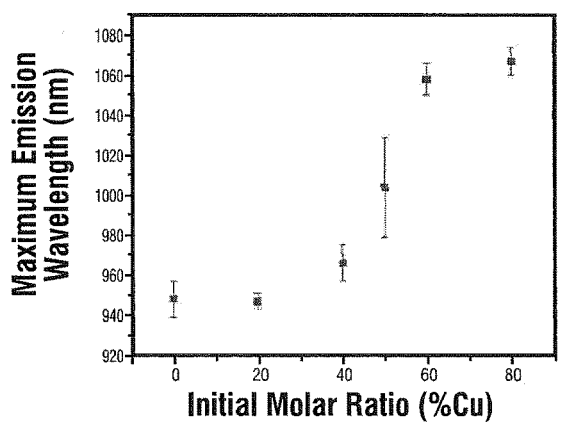
*Fig.16B*
*Fig.16*
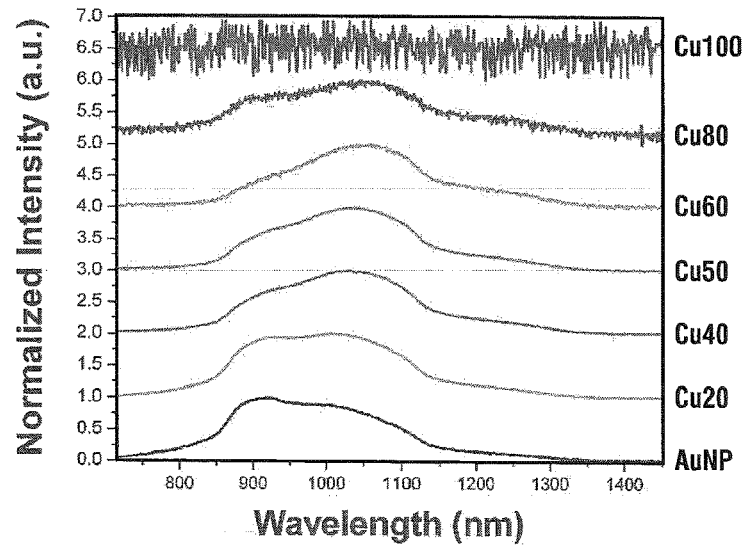
*Fig.17*

METHOD FOR PRODUCING SMALL METAL ALLOY NANOPARTICLES

CROSS REFERENCE TO RELATED APPLICATION

This application claims the benefit of provisional patent application U.S. Ser. No. 61/804,353 filed Mar. 22, 2013, by the present inventor(s), which is incorporated by reference herein in its entirety for all purposes.

TECHNICAL FIELD

The present invention relates to a process for the production of metal alloy nanoparticles, particularly but not exclusively, the production of small metal alloy nanoparticles having enhanced properties such as increased photoluminescence in near infrared region which may be employed in applications in the catalysis, bio-imaging and nano-medicine fields.

BACKGROUND

Alloyed materials are a long-studied class of metallic solids with a variety of applications. In the bulk, alloys are described as solid solutions of metals. The "solvent" or "host" is the element present in the greatest amount, and the "solute" is the minor component. At the bulk scale, the formation of the alloy may be understood by considering the overall free energy of metal mixing. Mixing of two metals creates a favorable entropic term. However, the enthalpy of formation may or may not be negative depending on the metals and will often dominate the free energy of formation at low temperatures. Therefore, the majority of bulk alloys are formed by a diffusion-quench process where two metals are mixed at high temperature and then cooled rapidly to "freeze" the combined state. The resulting material compositions are generally described by experimentally-derived phase diagrams and a conceptual framework defined by Hume-Rothery that incorporates impacts of metal atom valency, size, and electronegativity.

It has been known for centuries that alloyed materials can dramatically enhance the properties of their constituent metals, and like their monometallic counterparts, may also exhibit significant changes in their physical properties at the nanometer length scale. From bronze to steel, alloyed materials have defined the technological capabilities of their times, and like their monometallic counterparts, can experience dramatic changes in their physical properties at the nanoscale. Indeed, multimetallic nanoparticles promise to provide improved catalysts for efficient use of fossil fuel resources as well as multifunctional tools in biomedical applications. However, current methods to prepare these particles are typically energy intensive and afford limited tunability of particle composition, especially with respect to particle surface structure. Yet, without well-defined architectures, the promise of this material wellspring cannot be achieved.

One particularly interesting class of these materials is small metal nanoparticles (diameter (d)≅2-5 nm) which exhibit properties different from both metal clusters (<200 atoms) and larger metal nanomaterials (d>5 nm). These "few nm" particles display both unique catalytic and optoelectronic behaviors. For example, gold, silver, and copper nanoparticles all exhibit photoluminescence (PL). Gold nanoparticles exhibit PL emission throughout the visible and near-infrared (NIR) depending upon their size, shape, and surface chemistry. Yet, aspects of the PL from metallic nanostructures are not well understood and proposed mechanisms differ for gold nanoparticles (AuNPs) that exhibit localized surface plasmon resonances (LSPRs) and small gold nanoparticles, which do not.

In anisotropic nanoparticles that exhibit an LSPR, PL is observed between ~630-750 nm, and is attributed to emission from the plasmon band. As the diameter of the nanoparticle decreases below 3 nm, the LSPR of the AuNPs no longer manifests, and instead these particles exhibit PL in the NIR region with a large shift (~600 nm) between their absorption and emission wavelengths. Further decreases in particle size result in a hypsochromic shift of the NIR emission and an increase in quantum yield ($\Phi$). Photoluminescence from these small AuNPs is attributed to emission from surface states, since experiments have shown that the number of gold(I)-thiolate bonds on the particle surface is well-correlated with observed PL intensity. Because the NIR PL of AuNPs occurs only at small diameters, the ability to tune this optoelectronic behavior has been limited. However, tuning of the particle composition within the same size range could allow for increased versatility in this class of nanomaterials, and present a new perspective on the underlying PL phenomena of small metal nanoparticles.

For high surface area alloys, and in particular nanoparticles, surface composition is a critical parameter in the function of the material. The significance of both the formation and architecture of the nanoparticle surface derives from a canonical difference between bulk and nano scale materials: the surface to volume atom ratio. In applications such as catalysis, the large number of surface atoms per unit mass is preferred because it improves the economy of the catalytic cycle (i. e. there are more active catalyst sites per unit mass). However, large surface areas pose a challenge for the synthesis, stabilization, and rational design of nanoparticle alloys. For small alloys (d=1-5 nm), the mixing behavior of two metals is dominated by a parameter termed "surface segregation energy" (SSE) and is reported as a function of metals mixed and crystal facet exposed. SSE defines the change in energy to exchange a solute atom in the bulk host with a surface atom of the host crystal.

According to the present disclosure, preferred methods are presented for the synthesis of small, discrete gold-copper nanoparticle alloys with tunable compositions from 0-100% molar ratio Cu (d≅2 to 3 nm). The resulting materials display some of the first observations of composition-driven, tunable PL in the NIR region. To synthesize these nanoalloys according to preferred aspects of the present disclosure, the molar ratio of metal precursors may be adjusted in order to mediate final metal molar ratio in the resulting nanoparticle.

In accordance with the present disclosure, the SSE surface energy of the nanoparticles may be modulated in order to tune separation behavior in colloidal nanoparticle alloys. This preferred approach modulates the surface segregation energies of two metals in solid solution by using organic ligands to modify the surface energy of the constituent metals via coordination. These new methods according to preferred aspects of the present disclosure, as well as the resulting material library, should greatly expand the utility of small nanoparticles and provide the clarity necessary to implement these multifunctional platforms. In accordance with the present disclosure, a series of Au—Co, Au—Ni, Au—Cu, Au—Fe, Au—Ag, and Au—Zn nanoparticles have been synthesized, each with controlled molar ratios of the solute metal. This composition control has led to the discovery of a new class of NIR emitters. These results have impact for the catalysis, bioimaging, and nanomedicine communities.

SUMMARY

In a preferred aspect, the present disclosure comprises a method for producing small metal alloy nanoparticles of a first metal and a second metal, comprising: mixing, at room temperature in air, a first aqueous solution of first and second metal nanoparticle precursor species in a first molar ratio of the first metal to the second metal; mixing a separate organic ligand into the first aqueous solution; adding a reducing agent to the first aqueous solution; and aging the first aqueous solution for a first period.

In another preferred aspect, the method may further comprise: characterizing by photoluminescence or other property the metal alloy nanoparticles from the first aqueous solution.

In yet another preferred aspect, the first metal nanoparticle precursor species comprises gold(III) chloride trihydrate (HAuCl4 3H2O), the second metal nanoparticle precursor species comprises copper(II) nitrate hemipentahydrate (Cu(NO3)2 5H2O), the organic ligand comprises poly(ethylene glycol) methyl ether thiol and the reducing agent comprises sodium borohydride (NaBH4).

In another preferred aspect, the first metal nanoparticle precursor species comprises gold(III) chloride trihydrate (HAuCl4 3H2O), the second metal nanoparticle precursor species comprises silver nitrate (AgNO3), the organic ligand comprises poly(ethylene glycol) methyl ether thiol and the reducing agent comprises sodium borohydride (NaBH4).

In a further preferred aspect, each of the first and second metals is selected from the group consisting of gold, copper, silver, cobalt, nickel, iron and zinc.

In yet another preferred aspect, the metal alloy nanoparticles may comprise an alloy combination selected from the group consisting of Au—Co, Au—Ni, Au—Cu, Au—Fe, Au—Ag and Au—Zn.

In another preferred aspect, the method may further comprise: mixing, at room temperature in air, a second aqueous solution of the first and second metal nanoparticle precursor species in a second molar ratio of the first metal to the second metal; mixing the separate organic ligand into the second aqueous solution; adding the reducing agent to the second aqueous solution; and aging the second aqueous solution for the first period. Also, this method may further comprise: characterizing by photoluminescence or other property the metal alloy nanoparticles from the second aqueous solution; and comparing the photoluminescence or other property of the metal alloy nanoparticles from the first and second aqueous solutions, respectively.

In yet another preferred aspect, the metal alloy nanoparticles have a diameter ranging from about 1.8 nm to about 3 nm.

In another preferred aspect, the present disclosure comprises a method for producing metal alloy nanoparticles having increased photoluminescence in near infrared region comprising: mixing, at room temperature in air, a plurality of aqueous solutions of first and second metal nanoparticle precursor species, wherein each of the plurality of solutions contains a different molar ratio of the first metal to the second metal; mixing a separate organic ligand into each of the aqueous solutions; reducing each of the solutions by addition of a reducing agent; and aging the reduced solutions for a first period.

In yet another preferred aspect, the method may further comprise: characterizing by photoluminescence the resultant metal alloy nanoparticles produced from each of the plurality of aqueous solutions of different molar ratios of the first and second metals.

In another preferred aspect, the first metal nanoparticle precursor species comprises gold(III) chloride trihydrate ($HA_uCl_4$ $3H_2O$), the second metal nanoparticle precursor species comprises copper(II) nitrate hemipentahydrate (Cu(NO3)2 5H2O), the organic ligand comprises poly(ethylene glycol) methyl ether thiol and the reducing agent comprises sodium borohydride (NaBH4).

In yet another preferred aspect, the first metal nanoparticle precursor species comprises gold(III) chloride trihydrate ($HA_uCl_4$ $3H_2O$), the second metal nanoparticle precursor species comprises silver nitrate (AgNO3), the organic ligand comprises poly(ethylene glycol) methyl ether thiol and the reducing agent comprises sodium borohydride (NaBH4).

In an additional preferred aspect, each of the first and second metals is selected from the group consisting of gold, copper, silver, cobalt, nickel, iron and zinc.

In another preferred aspect, the metal alloy nanoparticles may comprise an alloy combination selected from the group consisting of Au—Co, Au—Ni, Au—Cu, Au—Fe, Au—Ag and Au—Zn.

In another preferred aspect, the metal alloy nanoparticles have a diameter ranging from about 1.8 nm to about 3 nm.

BRIEF DESCRIPTION OF THE DRAWINGS

To enable the present disclosure to be easily understood and readily practiced, the present disclosure will now be described for purposes of illustration and not limitation, in connection with the following figures wherein:

FIG. 3 are bright field STEM (A) and STEM-HAADF images (B) of $Au_xAg_y$NPs (Au:Ag 50:50 molar ratio); extinction spectra of purified NP from 0 to 100% Ag composition in water (C); HRTEM of a $Au_xAg_y$NP (Au:Ag 50:50 molar ratio) (D), and FFT analysis (E), shows the reciprocal lattice of the HRTEM in (D), lattice constant (a)=4.10±0.12 Å; and area STEM-EDS shows the presence of both silver and gold (F).

FIG. 4 shows Table 2 which summarizes the physical and spectral properties of the nanoparticle alloys produced according to preferred aspects of the present disclosure.

FIG. 16 shows normalized and offset emission spectra of $Au_xCu_yNPs$, excitation at 360 nm (A). Average emission wavelength as a function of the initial molar ratio of Cu (B) according to preferred aspects of the present disclosure.

FIG. 17 shows normalized and offset emission spectra of $Au_xCu_yNPs$ (0-100% Cu), excitation at 360 nm according to preferred aspects of the present disclosure.

DETAILED DESCRIPTION

Discrete gold nanoparticles with diameters between 2 and 3 nanometers (nm) show remarkable properties including enhanced catalytic behavior and photoluminescence. However, tenability of these properties is limited by the tight size range within which they are observed. The present disclosure is directed to, in a preferred aspect, the synthesis of discrete, bimetallic gold-copper nanoparticle alloys (diameter≅2-3 nm) which display photoluminescent properties that can be tuned by changing the alloy composition. Electron microscopy, X-ray photoelectron spectroscopy, inductively coupled plasma mass spectrometry, and pulsed field gradient stimulated echo $^1H$ NMR measurements show that the nanoparticles are homogeneous, discrete, and crystalline. By varying the composition of the nanoparticles from 0% to 100% molar ratio copper, the photoluminescence maxima shift from 947 nm to 1067 nm, with excitation at 360 nm. The resulting particles exhibit brightness values (molar extinction coefficient ($\varepsilon$) quantum yield ($\Phi$)) that are more than an order of magnitude larger than the brightest near-infrared emitting lanthanide and small molecule probes evaluated under similar conditions.

Figures 1, 2:
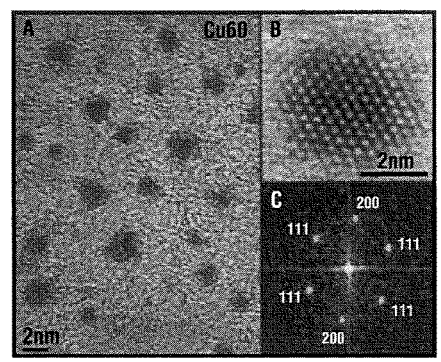
FIG. 1 is an HRTEM image of $Au_xCu_y$NPs (60:40 Cu:Au molar ratio) (A) and close-up of a particle lattice (B) with corresponding FFT (C).
FIG. 2 shows Table 1 which shows the initial reaction conditions for AuxCuyNP synthesis according to preferred aspects of the present disclosure.

In a typical experiment, alloyed nanoparticles were prepared in aqueous solution under ambient conditions by co-reduction of $HAuCl_4$ and $Cu(NO_3)_2$ in the presence of poly(ethylene glycol) methyl etherthiol (PEG-SH, average Mn=1000 Da) using $NaBH_4$ (see Table 1 of FIG. 2). Although PL has been observed from clusters such as $Au_{85}Ag_{55}$ and $Ag_7Au_6$, in preferred aspects, the present disclosure has focused on Cu nanoparticle alloys in order to avoid any ambiguity from photoreactivity of Ag species (although our synthetic strategy can be used to produce $Au_xAg_y$ alloys (FIG. 3) and $Au_xAg_y$ cluster species have been successfully studied previously). Here, the initial molar ratio of Au to Cu was adjusted from 0% to 100% Cu while holding all other reagent concentrations constant. Particles were purified by centrifugation using molecular weight cut-off filters to remove excess reagents and reaction byproducts. Table 2 of FIG. 4 summarizes the physical and spectral properties of the alloy nanoparticles produced according to preferred aspects of the present disclosure.

Figure 5:
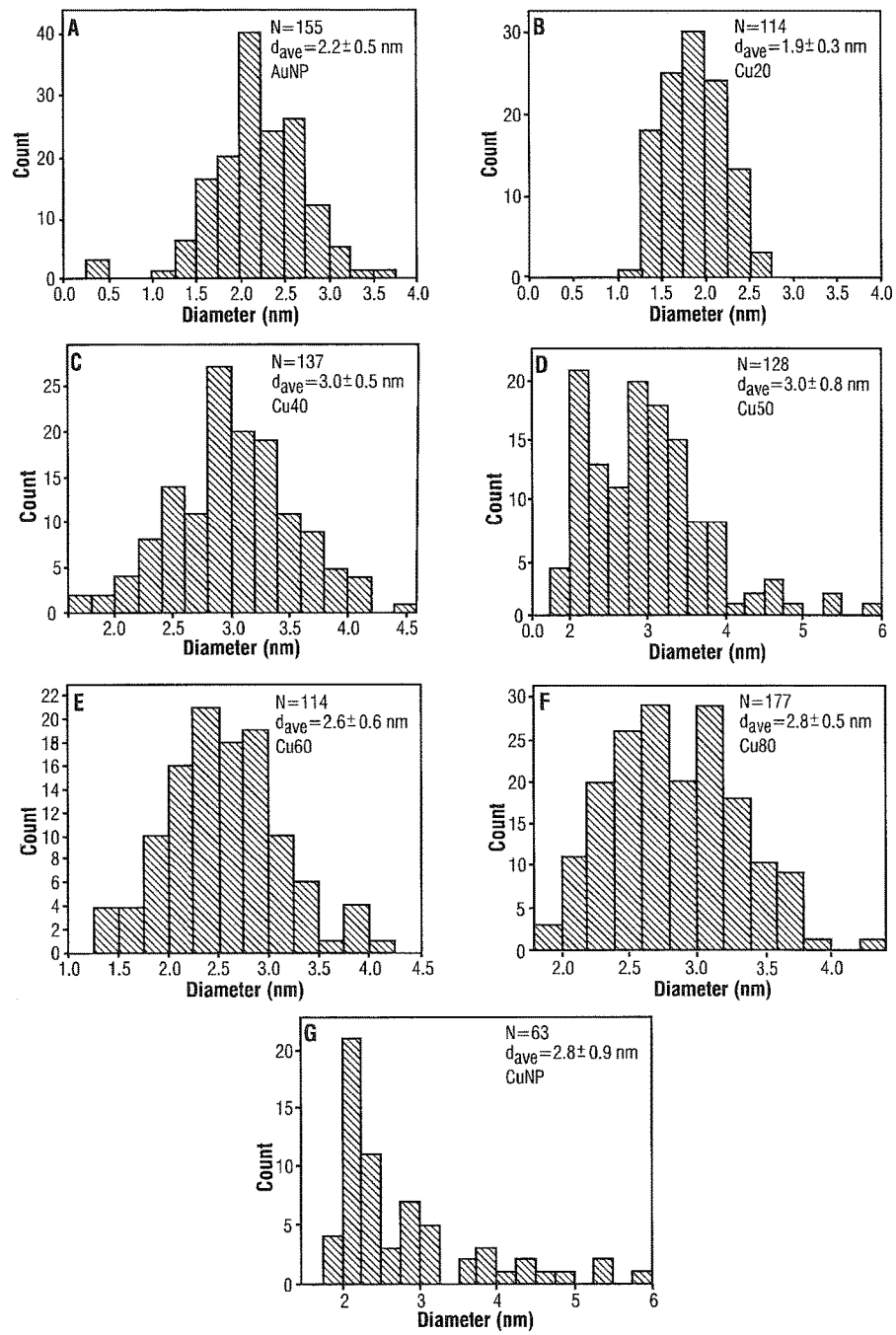
FIG. 5 are histograms showing the diameter distribution of AuNP (A), Cu20 (B), Cu40 (C), Cu50 (D), Cu60 (E), Cu80(F), and CuNP (G) according to preferred aspects of the present disclosure.
Figure 6:
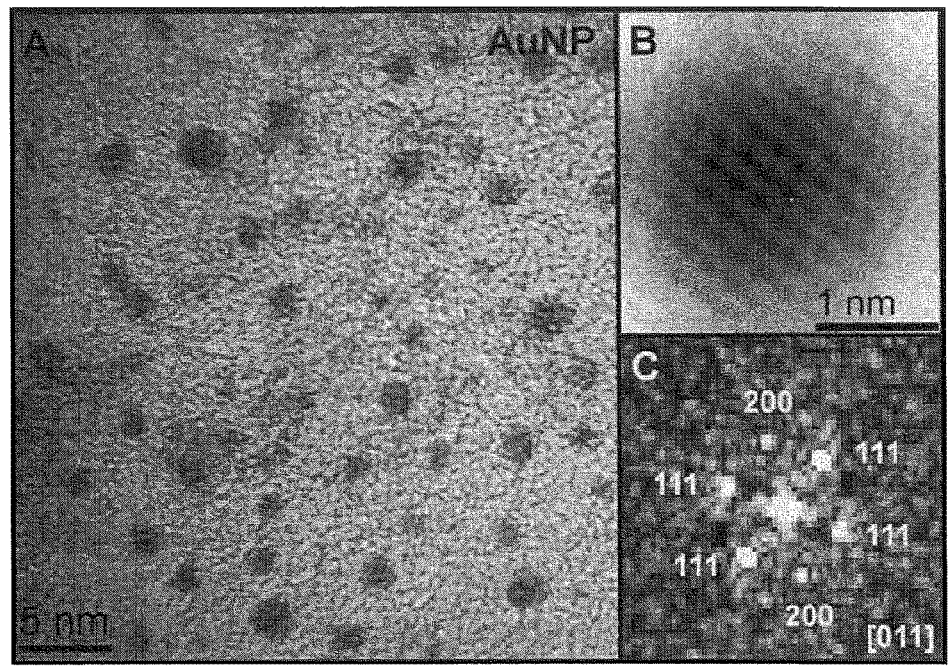
FIG. 6 shows extended view (A), close-up HRTEM (B), and corresponding indexed FFT images of AuNPs (C) according to preferred aspects of the present disclosure.
Figure 7:
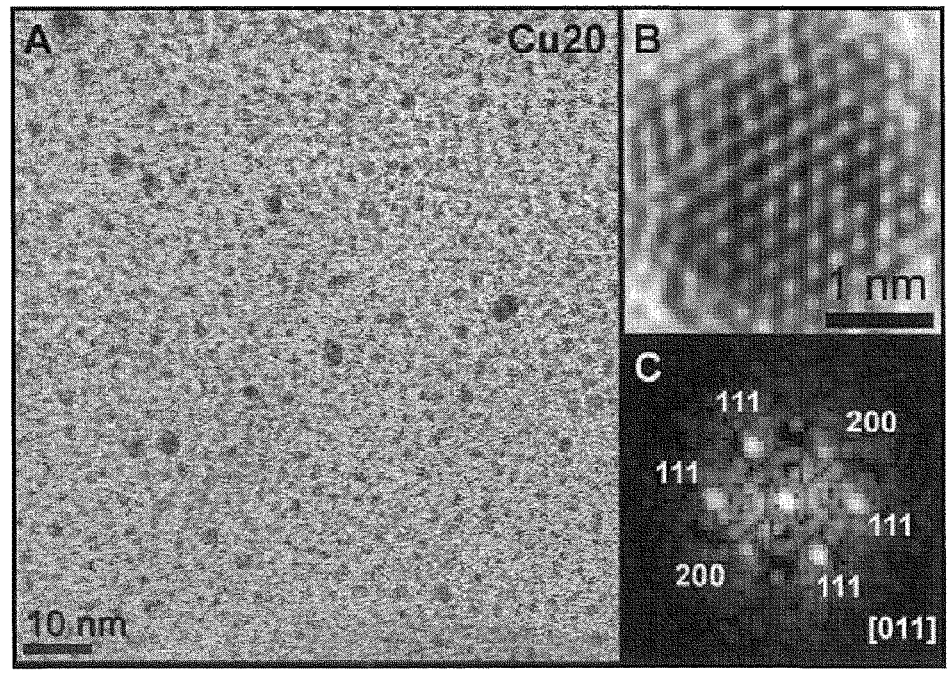
FIG. 7 shows extended view (A), close-up HRTEM (B), and corresponding indexed FFT images of Cu20NPs (C) according to preferred aspects of the present disclosure.
Figure 8:
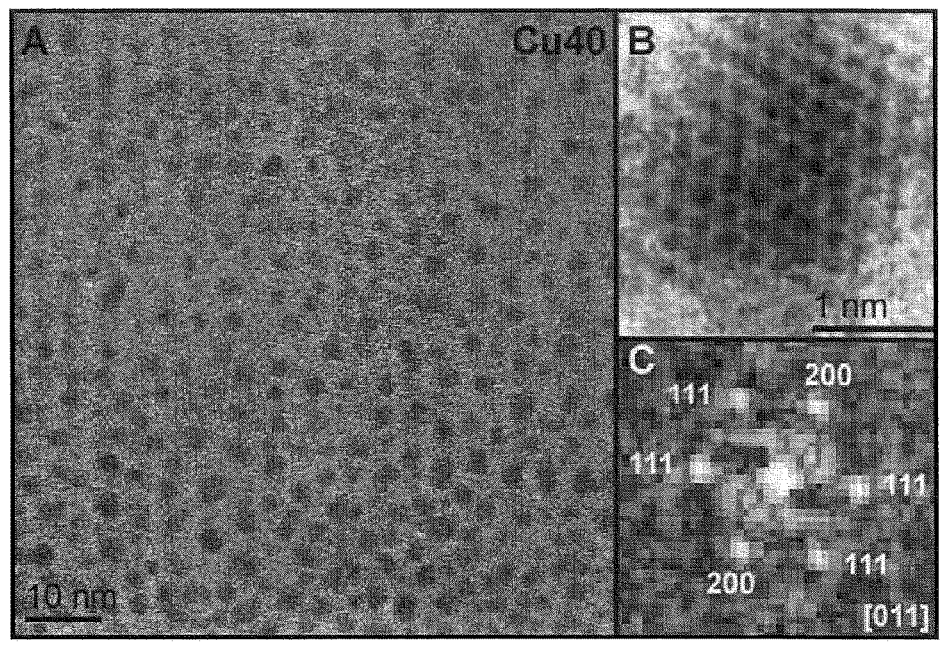
FIG. 8 shows extended view (A), close-up HRTEM (B), and corresponding indexed FFT images of Cu40NPs (C) according to preferred aspects of the present disclosure.
Figure 9:
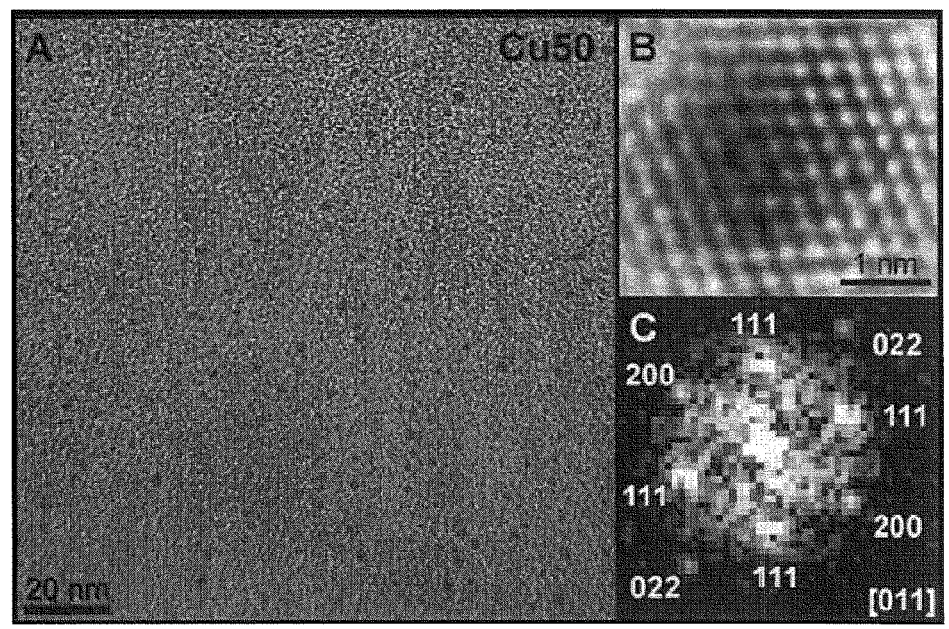
FIG. 9 shows extended view (A), close-up HRTEM (B), and corresponding indexed FFT images of Cu50NPs (C) according to preferred aspects of the present disclosure.
Figure 10:
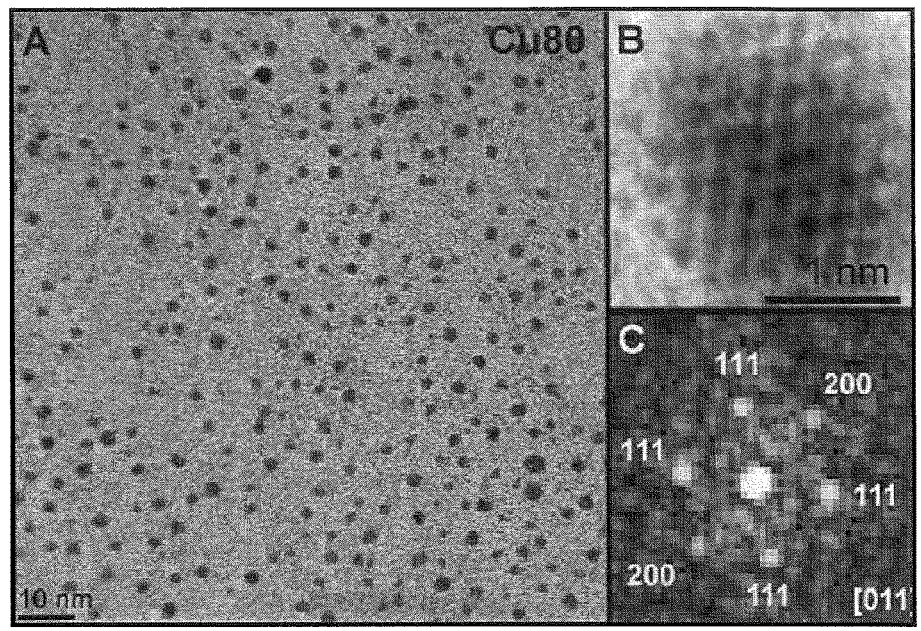
FIG. 10 shows extended view (A), close-up HRTEM (B), and corresponding indexed FFT images of Cu80NPs (C) according to preferred aspects of the present disclosure.
Figure 11:
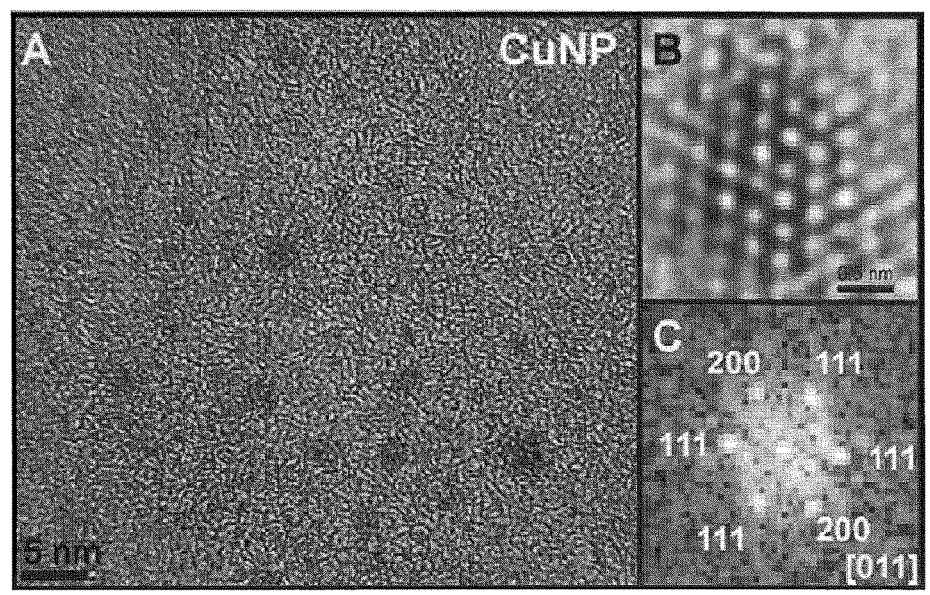
FIG. 11 shows extended view (A), close-up HRTEM (B), and corresponding indexed FFT images of CuNPs (C) according to preferred aspects of the present disclosure.

The size of the NP alloys was characterized by electron microscopy and pulsed field gradient stimulated echo (PF-GSE) $^1H$ nuclear magnetic resonance (NMR) measurements (FIG. 1 and FIGS. 4-11). The nanoparticles exhibit average diameters of 1.9 to 3.0 nm for all compositions. Standard deviations of NP diameters were within 15-27% of the average diameter for each alloy composition analyzed (FIGS. 4-5). Values obtained from high resolution transmission electron microscopy (HRTEM) were consistent with the hydrodynamic diameter as determined by $^1H$ NMR diffusion measurements, which should always be larger than the metallic core diameter. By comparing these measurements, the average thickness of the PEGSH shell was determined to be 1.6 to 3.2 nm.

Lattice constants (a) calculated from fast Fourier transform (FFT) analysis of HRTEM images show significant deviations from the lattice constant of bulk gold and are consistent with the formation of alloyed nanostructures (FIG. 1, FIG. 4 and FIGS. 6-11). Because the lattice constant of Au is larger than Cu, it may be expected to observe a general decrease in lattice constant as the incorporation of Cu increases. However, this trend does not consider lattice strain that appears at small particle sizes or intermetallic states that are known to deviate from this trend. According to the present disclosure it is unclear whether these nanoparticles are homogeneous, random, or intermetallic alloys in order to more fully explain the observed lattice constants.

Figure 12A:
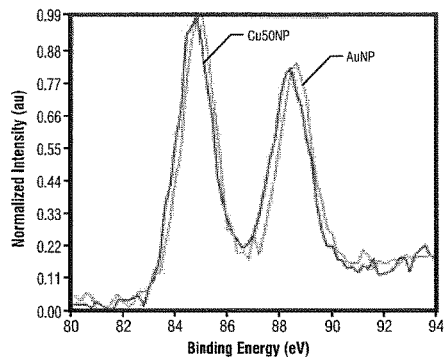
FIG. 12 is an XPS spectra of AuNP (gold, 4f) and Cu50 (gold 4f) (A), Cu50 (copper 2p) and CuNP (copper 2p) (B) on silicon wafers according to preferred aspects of the present disclosure.
Figure 12B:
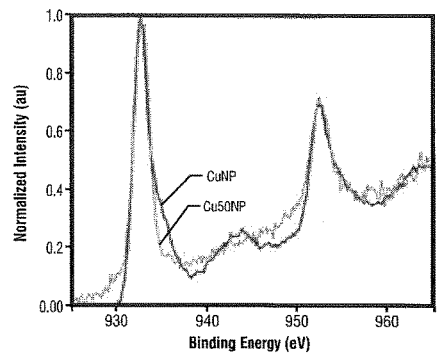

X-ray photoelectron spectroscopy (XPS) clarifies whether oxidation has impacted the observed crystal structures. For alloyed compositions, XPS indicates the presence of metallic Au and Cu (FIG. 12). However, for 100% Cu NPs, both the HRTEM-derived lattice constant and XPS analysis are consistent with the formation of a copper oxide phase (FIG. 12B). Importantly, HRTEM and scanning transmission electron microscopy (STEM) analysis do not show evidence of core-shell or Janus-type particle formation and indicate that both metals are present within a single particle (vide infra).

Figure 13:
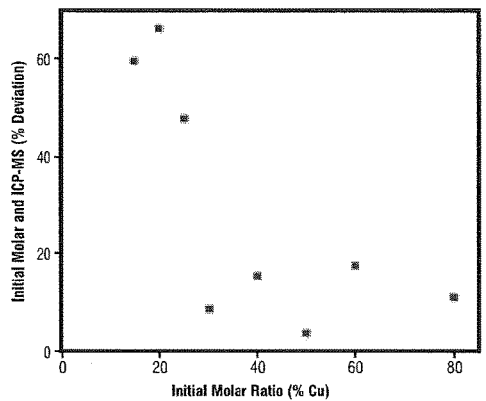
FIG. 13 shows plot of deviations in the initial molar ratio of Cu added to reaction mixture (in % Cu) from the molar ratio of Cu incorporated into the NP alloys as measured by ICP-MS.

The elemental composition of the nanoparticles was characterized by inductively coupled plasma mass spectrometry (ICP-MS), XPS, and energy dispersive X-ray spectroscopy (EDS) as well as photoluminescence measurements. EDS provides the spatial resolution necessary to confirm that both detected elements are located within a single particle, while ICP-MS allows us to determine the composition of the bulk colloid. EDS point spectra of individual particles indicate that the ratios of gold and copper scale roughly with the molar ratio of metal precursors added to the reactant solution. Compositions measured by ICPMS were consistently enriched in gold relative to the initial molar ratio used for the synthesis (FIG. 4 and FIG. 13). This apparent enrichment may be expected, as it is well known that copper leaches from nanoparticles during extensive washing procedures. Powder X-ray diffraction (XRD), a technique routinely used for the bulk characterization of larger NPs, did not provide useful composition information. The combined effects of small particle size (d<3 nm) and particle lattice strain (as evidenced by HRTEM analysis), produced Scherrer broadening that prohibited comparison between nanoparticle types.

Figure 14:
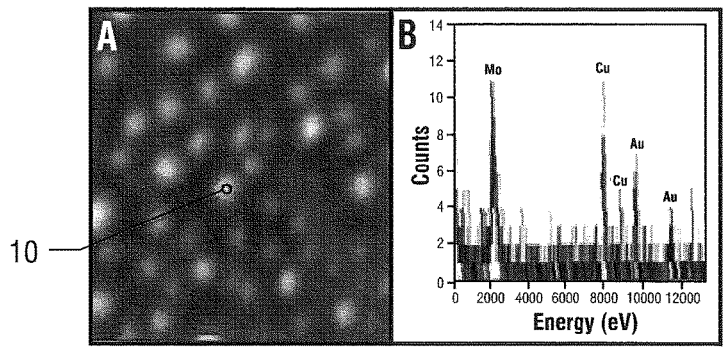
FIG. 14 shows STEM-HAADF image (A) and corresponding EDS spectrum (B) demonstrating the elemental composition of a single $Au_xCu_yNP$ (60:40 Cu:Au ratio) according to preferred aspects of the present disclosure.
Figure 15:
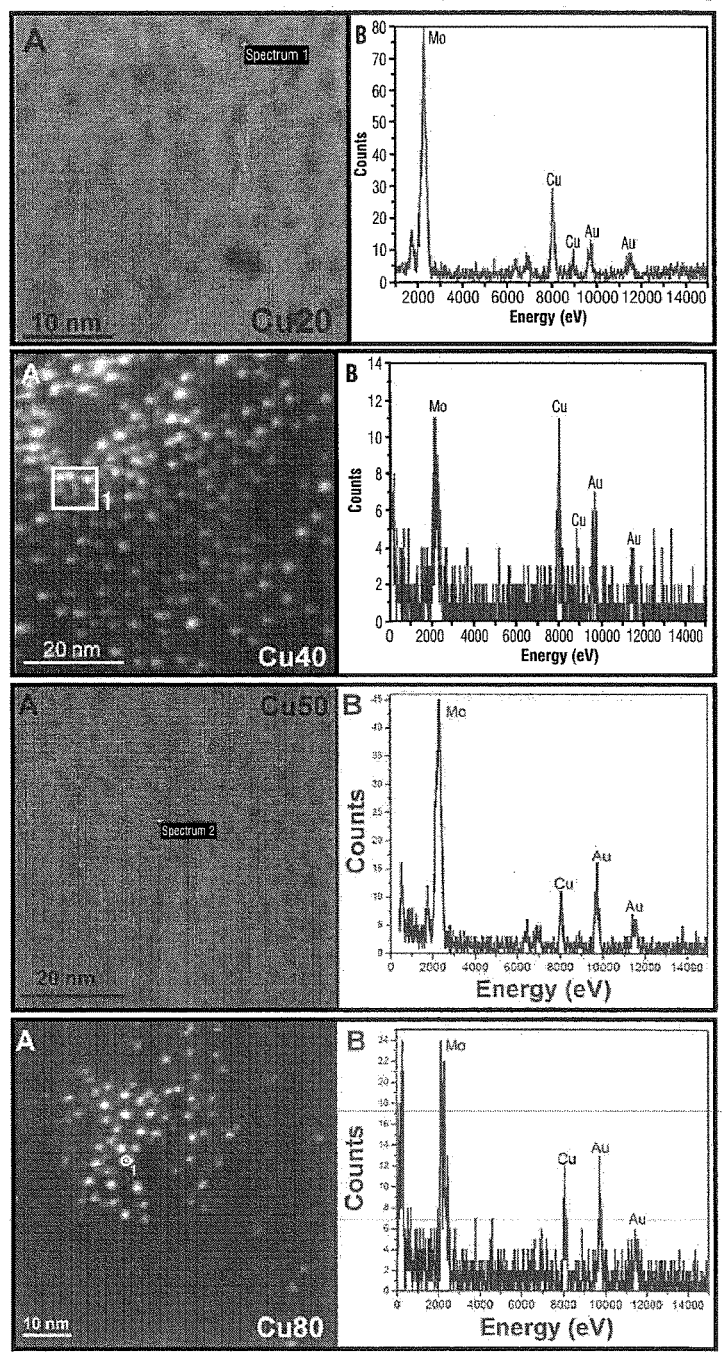
FIG. 15 shows representative STEM (A) and corresponding EDS spectra (B) of $Au_xCu_yNPs$ (Cu20, Cu40, Cu50, and Cu80) on molybdenum 400 mesh grids according to preferred aspects of the present disclosure.

To gain a better understanding of the elemental distribution throughout these particles, and specifically to distinguish between the formation of core-shell, Janus, or alloyed morphologies, the nanoparticles were characterized by STEM imaging coupled with high-angle annular dark field (HAADF) and EDS. As was found from the HRTEM analysis, STEM-HAADF images are consistent with the formation of alloyed NP structures (FIGS. 14-15), and no evidence of core-shell segregation of Au and Cu can be observed. STEM-EDS point spectra taken from individual NPs indicate that gold and copper exist within a single nanostructure (FIGS. 14-15). The spectrum is taken at the position indicated by the circle 10 (Mo signal in EDS spectrum originates from the Molybdenum 400 mesh TEM grid used to image the particles).

Figure 18A:
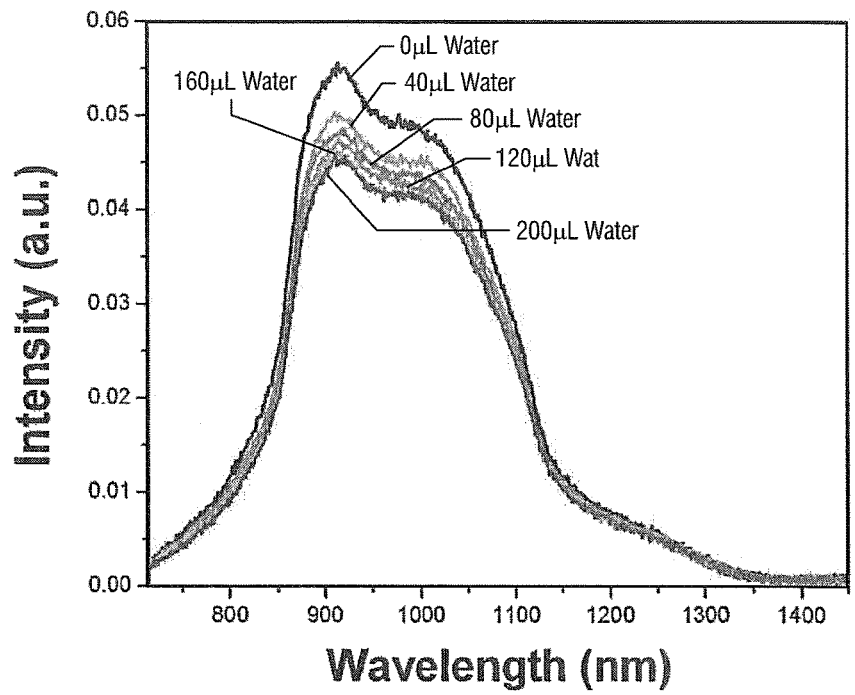
FIG. 18 illustrates evaluation of the photoluminescence of AuNP after titration with control titration using NANOpure water (A) and 20.0 mM Cu(NO3)2 (B) according to preferred aspects of the present disclosure.
Figure 18B:
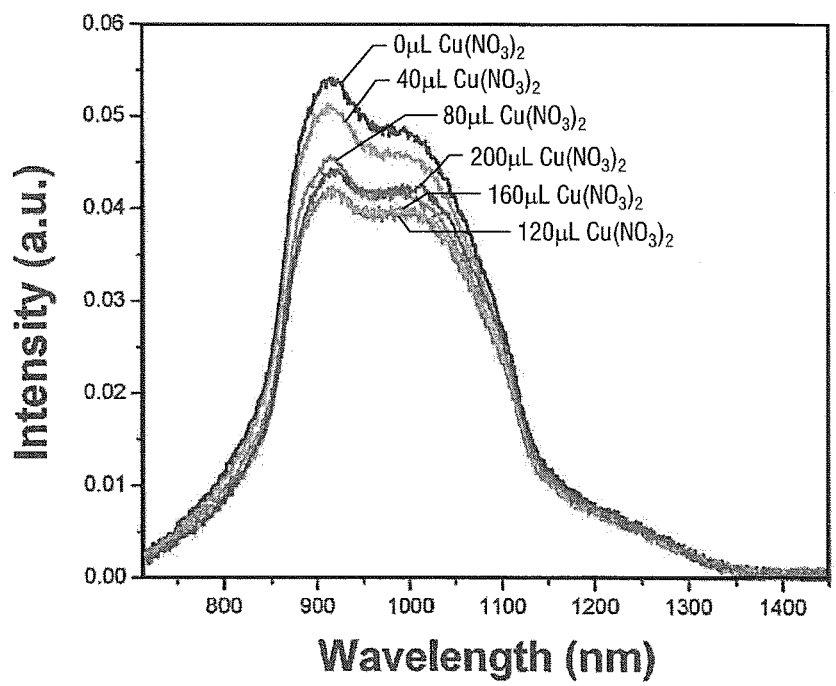
Figure 19:
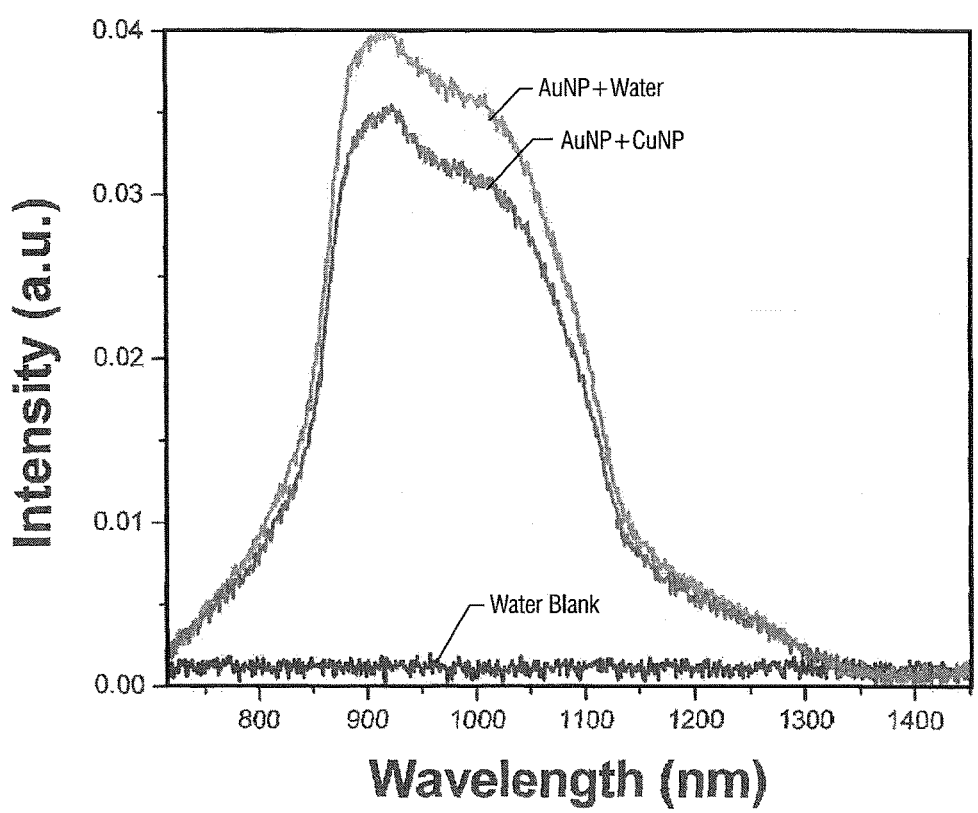
FIG. 19 shows emission spectra of an equal volume mixture of AuNP and CuNP (~50/50 volume) in water compared to a solution of AuNP diluted with the same volume of water according to preferred aspects of the present disclosure.
Figure 20A:
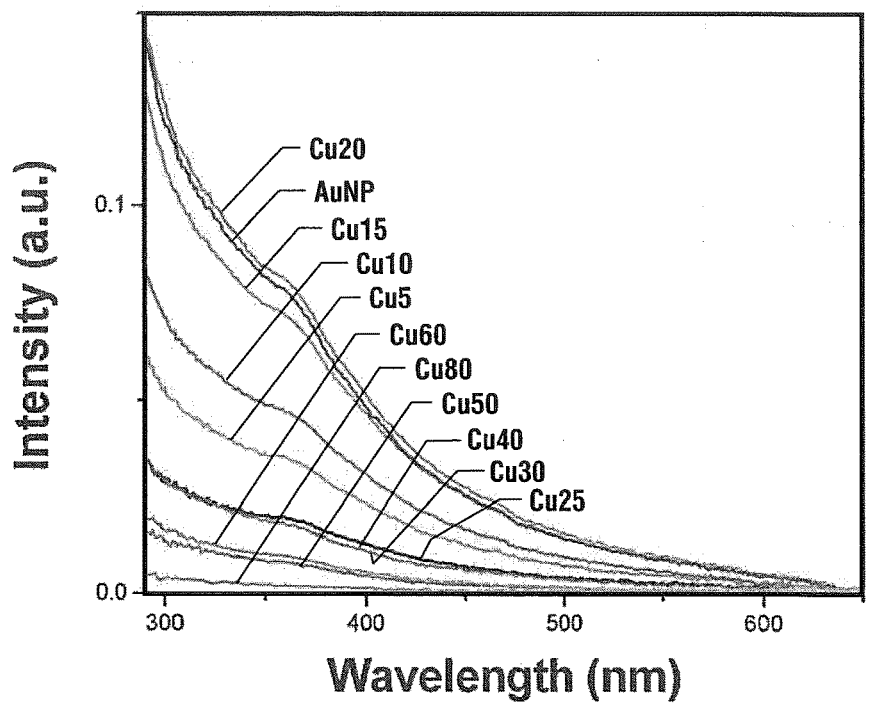
FIG. 20 shows excitation spectra (A) and normalized excitation spectra (B) of $Au_xCu_yNPs$ in water at room temperature $\lambda EM=950\pm40$ nm according to preferred aspects of the present disclosure.
Figure 20B:
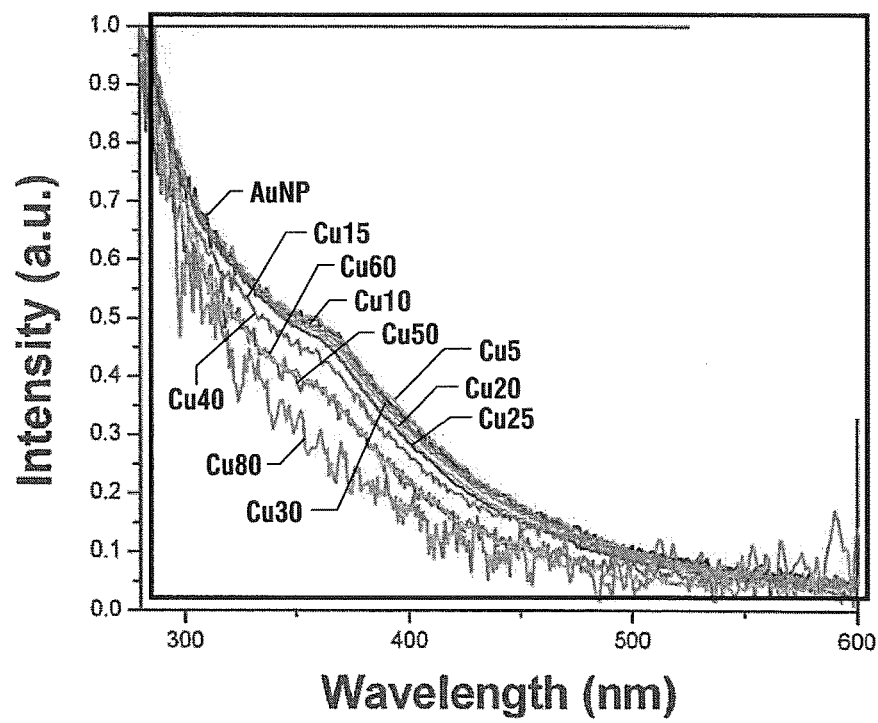
Figure 21:
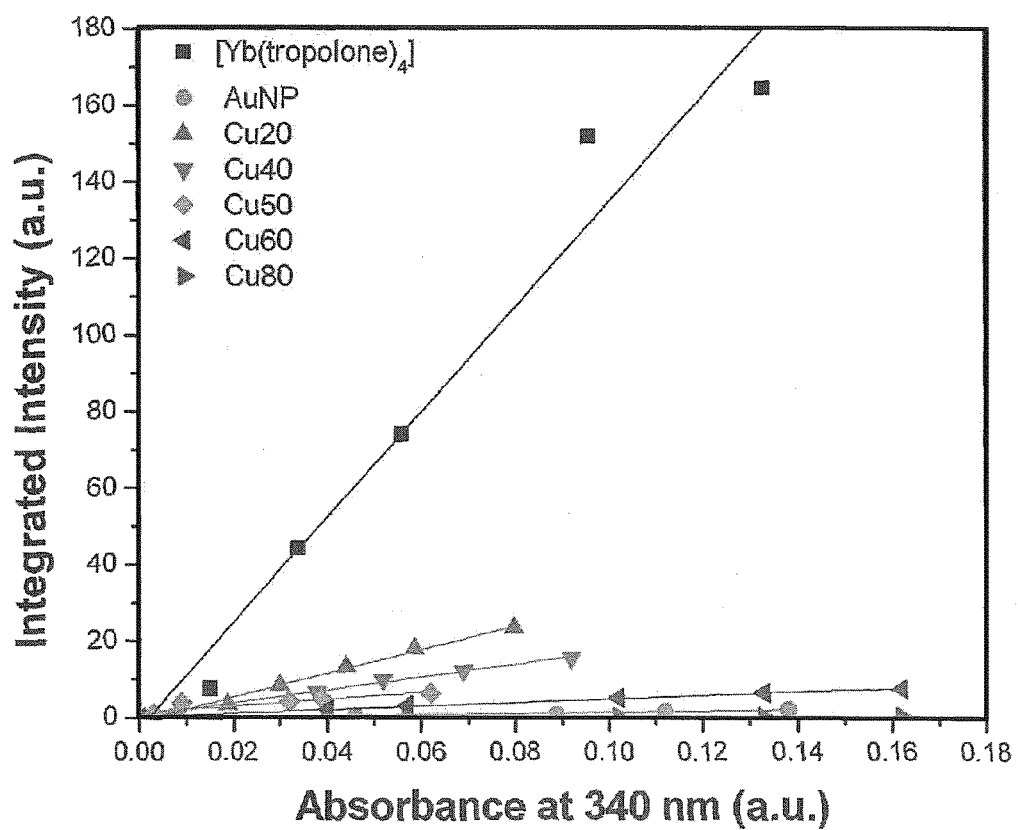
FIG. 21 shows examples quantum yield ($\Phi_x$) determination plots for purified $Au_xCu_yNPs$ in water and the [Yb(Tropolone)4]-reference in dry DMSO according to preferred aspects of the present disclosure.
Figure 22A:
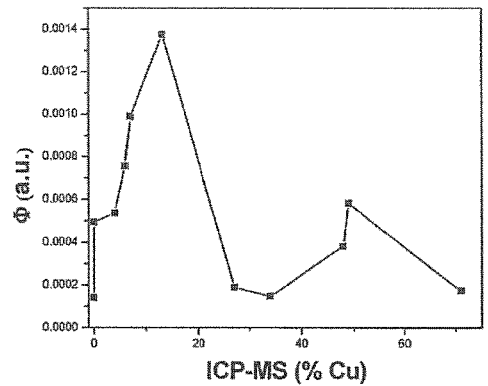
FIG. 22 shows correlation of quantum yield with nanoparticle composition (% Cu, as determined by ICP-MS) (A), and initial molar ratio added (% Cu) (B) according to preferred aspects of the present disclosure.
Figure 22B:
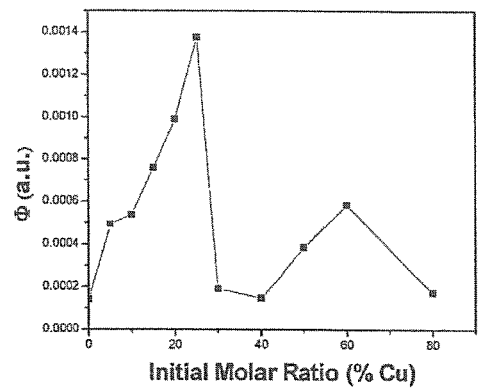

With discrete, alloyed nanoparticles in hand, particle architecture was correlated with photoluminescence to show a strong relationship between particle composition and particle PL properties (FIG. 16). As the molar ratio of copper increases, the PL emission maximum undergoes a bathochromic shift from 947 nm to 1067 nm (FIG. 16). Yet the full-width at half maximum (FWHM) of the peak remains similar even though the peak shape and position change with copper content (FIG. 4). The source of the peak asymmetry is still under investigation and consistent with other PL reports of gold nanoparticles. However, we do not find correlation of the observed PL with a direct emission from copper nanoparticles or copper complexes. Control experiments were performed to rule out the impact of NP concentration, aqueous copper, and physical mixtures of AuNPs and CuNPs on the observed emission shifts (FIGS. 17-19). Excitation spectra were collected to determine the excitation peak maximum while monitoring the emission at 950 nm. An excitation maximum was found at approximately 360 nm for all tested compositions of $Au_xCu_y$ NPs (FIG. 20). Currently, we cannot report a definitive assignment of this excitation, however, the wavelength is consistent with previously reported excitation of surface gold(I)-thiolates. The relative luminescence quantum yield, $\Phi$, of the NPs was evaluated by using a ytterbium complex [Yb(tropolone)4]- as a NIR reference standard ($\Phi r$=0.019 in DMSO) using optically dilute aqueous solutions (absorbance at 340 nm<0.2; FIG. 21). The calculated $\Phi$ of 100% AuNPs ($\Phi$=1.9×10$^{-4}$, see FIG. 4) is within the range of previously reported quantum yields for similar structures which vary from 10$^{-5}$ to 10$^{-1}$ (determined at various emission wavelengths). The measured quantum yield increases from a composition of pure gold to 25% Cu (initial molar ratio) and then decreases with additional Cu incorporation (FIG. 22).

Since the PL properties of small noble metal clusters have been shown to vary with NP size (similar to semiconductor quantum dots), 7 we examined these features as a function of the particle diameter. No correlation was found between the emission peak wavelength and either the size of the metal core or hydrodynamic radius (FIG. 23). Taken together, these observations are consistent with a surface-based PL excited state governed by excitation of the gold (I)-thiolate charge transfer band and further indicate that composition may be a key synthetic tool for tuning the photophysical properties of small metal nanoparticles.

Figure 24A:
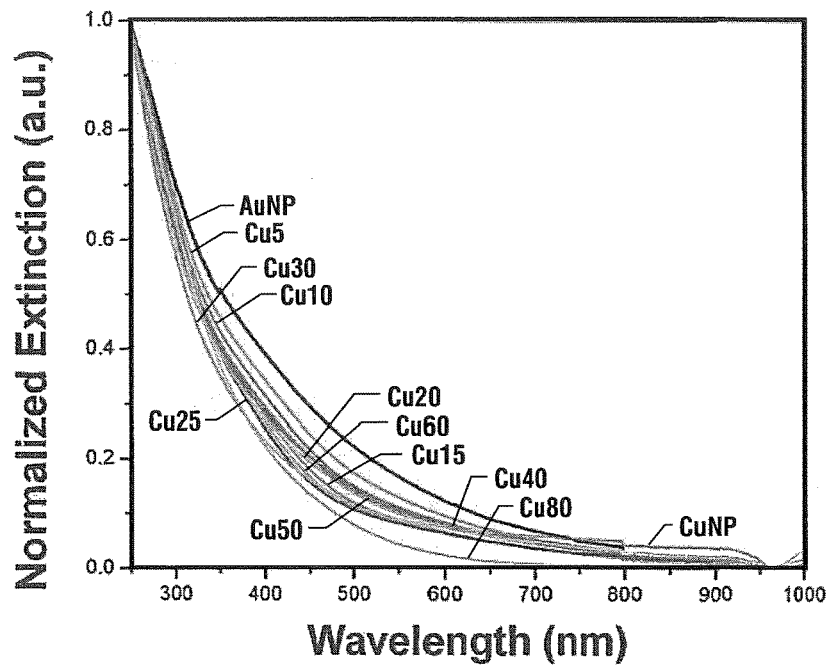
FIG. 24 shows representative UV-vis-NIR of $Au_xCu_yNPs$ as synthesized (A), and purified (B) in water at room temperature according to preferred aspects of the present disclosure.
Figure 24B:
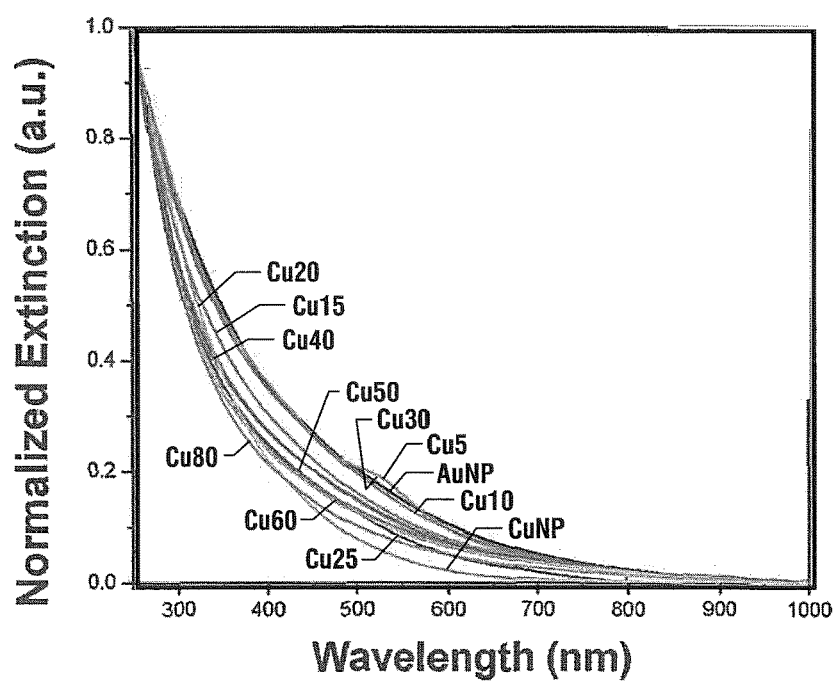

A crucial parameter in determining the utility of these nanoparticles is their brightness ($\varepsilon \cdot \Phi$), which must be evaluated at the optically dilute limit, a figure of merit to describe the probability of absorption and emission of photons for a given system.[26,27] Extinction coefficients were calculated using UV-vis absorbance spectra (FIGS. 24-25), the concentration of gold and copper as measured by ICP-MS (Table 2 of FIG. 4), and the average particle diameter as determined by HRTEM (FIG. 5). By tuning the molar ratio of Au and Cu we are able to produce alloyed nanoparticles that are more than an order of magnitude brighter than the brightest lanthanide probe (3281 M$^{-1}$ cm$^{-1}$ for 40:60 Cu:Au ratio NPs vs. 83 M$^{-1}$ cm$^{-1}$ for a previously reported sensitized lanthanide complex (Yb(III)TsoxMe))[28] and are photobleaching resistant compared to organic dyes.

The gold-copper nanoparticle alloys exhibit enhanced emission intensity (a 10% to 29% $\Phi$ relative enhancement, FIG. 26), under biologically relevant conditions (0.020 M HEPES buffer pH of 7.2, I=0.10 M NaCl) relative to the same NPs in NANOpure water.

In summary, we have outlined a straightforward synthesis of small, discrete $Au_xCu_y$ NP alloys that display composition-tunable NIR emission. The brightness of these nanoparticles exceeds that of the brightest NIR emitting lanthanide probes. Fundamentally, these nanoparticle alloys provide a new platform to investigate the structural origins of small metal nanoparticle PL. Practically, the observation of these PL phenomena indicates a promising class of stable and tunable NIR probes that can be readily translated into biological settings.

General Materials and Methods.

Hydrogen tetrachloroaurate(III) trihydrate ($HAuCl_4 \cdot 3H_2O$, 99.999%), copper(II) nitrate hemipentahydrate ($Cu(NO3)2.5H2O$, >99.99%), poly(ethylene glycol) methyl ether thiol (average $M_n$=1000 Da), sodium borohydride ($NaBH_4$, 99.99%), dimethyl sulfoxide (DMSO, $(CH_3)_2SO$>99.9%), and silver nitrate ($AgNO_3$, 99.9999%) were obtained from Sigma-Aldrich and used as received unless otherwise indicated. NANOpure (Thermo Scientific, >18.2

MΩ·cm) water was used in the preparation of all solutions. All stock solutions were freshly prepared in water before each reaction, unless otherwise noted. Before use, all glassware and Teflon coated stir bars were washed with aqua regia (3:1 ratio of concentrated HCl and $HNO_3$ by volume) and rinsed thoroughly with NANOpure water. Caution: Aqua regia is highly toxic and corrosive and requires proper personal protective equipment. Aqua regia should be handled in a fume hood only.

Synthesis.

Nanoparticles were synthesized in NANOpure water at room temperature under ambient atmosphere. Aliquots of reagents were added (in the following order) to a glass vial containing a stir bar: 4.29 mL water, 20.0 mM $HAuCl_4$, 20.0 mM Cu(NO3)2, 375 µL of 10.0 mM PEG-SH, and 400 µL of 20.0 mM $NaBH_4$ (volumes listed in Table Si). The total concentration of metal cations was held constant while the molar ratio of gold and copper was varied (Table 1 of FIG. 2).

After thoroughly mixing the gold and copper solution by vortexing for ~10 s, 375 µL of PEG-SH (10.0 mM) was quickly added to the solution and briefly mixed by vortexing. A change in the solution color was observed from a pale to dark yellow. The metal and capping ligand precursor solution was immediately reduced by a rapid injection of 400 µL of 20.0 mM solution of $NaBH_4$ (fresh and ice cold) while vigorously stirring (1100 rpm) for 1-2 min. The capped vials were "aged" on the benchtop for at least 1 hour prior to purification. Gold-silver alloys were synthesized using the same protocol described above, using a $AgNO_3$ salt instead of the $Cu(NO_3)_2$ salt (FIG. 3).

Purification.

The entire contents of the NP synthesis were transferred to a Pierce® 9 kDa molecular weight cut-off concentrator (Thermo Scientific, Inc.). Samples were purified by removal of excess PEG-SH and salts using an Eppendorf 5804R centrifuge with swing bucket rotor (A-44-4) (Eppendorf, Inc.) with a force of 3500 RFC at 20° C. for 30 min. The resulting concentrated particles in 100-200 µL of water were diluted in the concentrator tube to a volume of 7 mL using water. The loose pellet was resuspended by gentle and careful mixing by pipette prior to centrifugation. This washing procedure by centrifugation was repeated 4 additional times. Purified $Au_xCu_y$NPs were then characterized by photoluminescence, ICP-MS, and electron microscopy techniques. UV-vis-NIR spectra (FIG. 24) show nanoparticles before and after purification and are consistent with no significant growth during purification according to the present disclosure.

Transmission Electron Microscopy.

An aliquot from the resulting purified NP solution was diluted 1/10 with NANOpure water prior to drop casting onto ultra-thin carbon or lacey-carbon TEM grids (Ted Pella, Inc.), 5 nm thick silicon nitride grids (TEM Windows, Inc.), or <10 nm thick molybdenum 400 mesh carbon grids (Pacific Grid Tech, Inc.). Samples were allowed to slowly air dry for at least 10 hours followed by drying under vacuum. One of the following microscopes was used for the characterization of particles: JEOL JEM-2100F equipped with a Gatan GIF-Tridiem camera and Oxford Inca EDS detector (Nanoscale Fabrication and Characterization Facility, Petersen Institute of Nanoscience and Engineering), JEOL JEM-2100 (Youngstown State University, Chemistry Department), or an FEI Tecnai F20 Super-Twin (Electron Microscopy Facility, Department of Materials Science and Engineering, Carnegie Mellon University). All instruments were operated at 200 kV. Scanning transmission electron microscopy characterization was performed using the JEM-2100F, Tecnai F20, or a Hitachi HD-2300A STEM with a field emission gun (RJ Lee Group, Inc., Monroeville, Pa.), operated at 200 kV. Representative STEM-BF, -HAADF and -EDS images from the JEOL JEM-2100F and the Tecnai F20 Supertwin are shown in FIG. 15 (vide infra). Samples were drop cast on molybdenum grids or silicon nitride grids for STEM analysis. The STEM-EDS values are an average of at least three measurements (point or area STEM-EDS) for two or more sample preparations. The associated error with EDS molar ratio is the standard deviation of the average.

Size Distribution.

The metallic core size distributions of the nanoparticles were determined using TEM images of at least 100 NPs from various areas of the grid. ImageJ 1.47 d (National Institutes of Health, USA) was used to measure and count all particles. Histograms were generated from the data collected by TEM using Origin 8.5 Professional. Average diameter and standard deviation were determined from the histogram plots (FIG. 5A-G).

Analysis of HRTEM Lattice

The lattice fringes observed in the HRTEM were converted into reciprocal space using a fast Fourier transform function in the Digital Micrograph v2.10.1282.0 (Gatan, Inc.) and/or ImageJ v 1.47 d (National Institutes of Health, USA). The angles between the spots and distance from the center of the reciprocal lattice were measured to determine the visible lattice planes and the zone axis using standard face-centered cubic (FCC) diffraction patterns to index the spots. The overall lattice constant for the particle was then determined for multiple (N>5) particles using only the spot corresponding to the 111 (these spots were consistently of greater intensity and could be more easily measured than the 200 spots). The average lattice constant and standard deviation determined for multiple NPs are reported in Table 2 of FIG. 4. Examples of measurements for each NP composition are shown in FIG. 1 and FIGS. 6-11. The average lattice constant (a) determined for the 100% CuNPs did not match either the literature values for bulk $Cu^0$ (FCC, a=3.6150 Å), $Cu_2O$ (cubic with Cu in FCC sublattice, a=4.2696 Å), or CuO (monoclinic, a=4.6837 Å). However, the calculated value (a=4.33±0.10 Å) is within error of the Cu2O lattice constant. The presence of CuO is consistent with the XPS spectra collected (vide infra, FIG. 12) of these particles synthesized from 100% Cu precursors.

X-Ray Photoelectron Spectroscopy.

X-ray Photoelectron Spectroscopy (XPS) was collected using a "home built" instrument. An aluminum Kα (1486.5 eV) anode was used, operating at 12 kV. Spectra were recording using a Venetian blind detector photomultiplier tube operating with a pass energy of 50 eV. The system was operated at a base pressure of less than $1 \times 10^{-9}$ torr. Samples of lyophilized NPs were dissolved in absolute ethanol and drop cast onto clean silicon (p-doped (boron), University Wafer, Inc.). Spectra were collected at 0.25 eV increments. XPS spectra of AuNP (gold, 4f), Cu50NP (gold, 4f and copper 2p), and CuNP (copper 2p) are shown in FIG. 12. The XPS spectra of the gold 4fs for the pure AuNP and the Cu50NP alloy are similar. Comparison of spectra taken from Cu50NP alloys and pure CuNPs indicates oxidation of the copper in the pure CuNPs but not in the alloys.

ICP-MS Analysis

Inductively coupled plasma-mass spectrometry (ICP-MS) analysis was performed using an argon flow with a Nexion spectrometer (PerkinElmer, Inc.). An aqua regia solution was prepared with a 3:1 ratio of hydrochloric acid (Sigma-Aldrich>99.999% trace metal basis): nitric acid (Sigma Aldrich, >99.999% trace metal basis) and diluted with NANOpure water (18.2 MΩ·cm) for a 5% (by volume) aqua regia matrix. Nanoparticle samples were prepared by concentrating the nanoparticles via centrifugation followed by digestion of the NPs overnight in ~500 μL of fresh and concentrated aqua regia solution. The digested solution was further diluted to 10 mL using the 5% aqua regia matrix in a volumetric flask. The unknown Au concentrations were determined by comparison to a 5-point standard curve with a range of 1-30 ppb (1, 5, 10, 20, and 30 ppb prepared by volume), from a gold standard for ICP (Fluka, TraceCERT 1000 mg/L Au in HCl) diluted in the 5% aqua regia matrix. The unknown Cu concentrations were determined in a similar manner with comparison to a 5-point standard curve with a range of 1-30 ppb (1, 5, 10, 20, and 30 ppb prepared by volume), from a copper standard for ICP (Fluka, TraceCERT 1000 mg/L Cu in HNO3) diluted in the 5% aqua regia matrix. All standards were measured 5 times and averaged, while all unknown samples were measured in triplicate and averaged. An 8 minute flush time with 5% aqua regia matrix was utilized between all runs, and a blank was analyzed before every unknown sample to confirm removal of all residual metals from the instrument. Averaged values and standard deviations from at least three independent syntheses are shown in Table 2 of FIG. 4. The percent deviation of the initial molar ratio of copper verses the averaged measured ICP-MS is shown in FIG. 13. A larger deviation of the % Cu measured by ICP-MS is observed in samples with lower initial amounts of copper used in synthesis. FIG. 13 shows a plot of deviations in the initial molar ratio of Cu added to reaction mixture (in % Cu) from the molar ratio of Cu incorporated into the NP alloys as measured by ICP-MS. This plot illustrates that at small concentrations of initial copper, the deviation is large, however, at higher concentrations the initial molar ratio of precursor added is in good agreement with concentrations measured by ICP-MS. The early Au-enrichment is attributed to Cu leaching during washing procedures.

Photoluminescence.

Solutions were prepared from the purified $Au_xCu_y$NP stocks at concentrations less than or equal to 0.2 abs at 340 nm determined by UV-vis using a Cary 5000 UVvis-NIR (Agilent, Inc.). UV-vis measurements were collected using 1.0 cm quartz cuvettes (Hellma, Inc.). Emission spectra were acquired on a HORIBA Jobin Yvon IBH FluoroLog-321 fluorometer equipped with a Hamamatsu R928 detector for the visible domain, DSS-IGA020L (Electro-Optical Systems, Inc.) detector for the NIR domain, and a temperature controller using a 1.0 cm×0.4 cm quartz cuvette (Hellma, Inc.). A 715 nm NIR cut-on (Oriel Instruments, RG-715) filter was used to block the excitation source.

The quantum yields in the NIR region were determined by the optically dilute method using the following equation (12)

$$\frac{\Phi_X}{\Phi_r} = \left[\frac{A_r(\lambda_r)}{A_x(\lambda_x)}\right]\left[\frac{(\lambda_r)}{(\lambda_x)}\right]\left[\frac{n_x^2}{n_r^2}\right]\left[\frac{D_x}{D_r}\right] \quad (12)$$

where A is the absorbance at the excitation wavelength (λ), I is the intensity of the excitation light at the same wavelength, n is the refractive index, and D is the integrated luminescence intensity (715-1450 nm). The subscripts 'x' and 'r' refer to the sample and reference, respectively. The reference used in this study was [Yb(Tropolone)4]- in dry DMSO ($\Phi_r$=0.019) following previously reported procedures. 5 Refractive index values of n=1.333 (AuNP in water) and n=1.479 (DMSO) were used. The estimated error in $\Phi_x$ was determined by the standard deviation of the mean of three independently synthesized batches of $Au_xCu_y$NPs in NANOpure water. Examples of the quantum yield determination plots are shown in FIG. 21.

The emission maxima (λEM) of the spectra were calculated by visually determining the wavelength at which the large emission intensity occurred. At least four of these emission maxima measurements were made for each composition. The standard error of the mean is reported in Table 2 of FIG. 4. This visual assignment was also used in the determination of the FWHM for the overall emission peak. The wavelengths corresponding to 50% of the maximum intensity on either side of the emission peak were used when a horizontal line connects these two points. At least four independent measurements were made, averaged and reported in Table 2 of FIG. 4 along with the standard error of the mean Importantly, we avoided using peak-fitting software to determine these values since we have no information regarding the number or peak shape of emissions comprising the final observed features.

Photoluminescence Titration.

In a quartz cuvette containing 1500 μL of purified AuNPs, 40 μL aliquots of 20.0 mM $Cu(NO_3)_2$ solution were added. Solutions were gentle mixed using a pipette. The solution was allowed to equilibrate for 5 minutes after each addition prior to measurement. Luminescence data was collected using the Fluorolog-321 exciting at 360 nm with silt width of 14.5 nm. The emission luminescence was collected at 1 nm increments with an emission slit width of 40 nm and integration time of 0.2 s. The experimental control using aliquots of NANOpure water were also collected (FIG. 18).

Physical Mixture.

A mixture of AuNPs and CuNPs was prepared by adding equal volumes of purified AuNPs and CuNPs and thoroughly mixing. The emission spectra were collected and compared to a solution of purified AuNPs diluted with the same volume of water (FIG. 19).

Excitation Spectra.

Excitation spectra of the purified $Au_xCu_y$NPs were collected using an emission silt of 20 nm centered at 1000 nm with an excitation silt of 5 nm. Spectra were collected in 1 nm increments using an integration time of 0.4 s from 250-700 nm and the NIR cut-on (715 nm) filter was used to filter the emission (FIG. 20). Excitation Spectra have been corrected for lamp power fluctuations and the instrument response.

Quantum Yield and Composition.

$Au_xCu_y$NPs were synthesized at 5% molar ratio Cu increments and the resulting nanoparticles were characterized by PL to determine the apparent intensity maximum as a function of composition (FIG. 21).

FIG. 22 shows correlation of quantum yield with nanoparticle composition (% Cu, as determined by ICP-MS) (A), and initial molar ratio added (% Cu) (B). Lines added to guide the eye. The nanoparticles according to this preferred aspect of the present disclosure reached an apparent maximum quantum yield at 25% molar ratio Cu.

PFGSE $^1$H NMR.

All NMR measurements were performed on a Bruker 500 Ultrashield™ magnet with AVANCE III 500 Console (Bruker Biospin, Billerica, Mass.) at 298 K. NMR samples were prepared by lyophilization of the colloidal suspension, resuspension in deuterated DMSO, and loaded in a 5 mm NMR tube for measurement. $^1$H NMR diffusion spectra were acquired on a broadband observe probe using a stimulated echo bipolar pulsed field gradient pulse sequence.

For a diffusing species examined with a stimulated echo bipolar pulsed field gradient sequence, the decay in signal intensity (1) is given by a modified Steskjal-Tanner equation:[6]

$$I = I_0 \exp\left(-(\gamma G \delta)^2 \left(\Delta - \frac{T}{2} - \frac{\delta}{8}\right) D\right) \quad (13)$$

where $I_0$ is the initial intensity, $\gamma$ is the gyromagnetic ratio of 1H, G is the applied gradient strength, $\delta$ is the length of the gradient pulse, $\Delta$ is the diffusion time, T is the time between bi-polar gradient pulses, and D is the apparent diffusion coefficient. Rearranging this equation gives $$\ln\left(\frac{I}{I_0}\right) = -(\gamma G \delta)^2 \left(\Delta - \frac{T}{2} - \frac{\delta}{8}\right) D = -kD \quad (14)$$

A plot of $\ln (I/I_0)$ vs k allows for direct extraction of the diffusion coefficient. Using the Stokes-Einstein equation allows the assignment of a hydrodynamic radius ($r_H$)

$$r_H = \frac{k_B T}{6\pi \eta D} \quad (15)$$

where $k_B$ is the Boltzmann constant, T is the temperature in Kelvin, and $\eta$ is the viscosity of the system. In order to accurately size the particles, DMSO was used as a reference molecule to calculate the particle radius ($r_{particle}$) with the following relation:

$$r_{particle} = \frac{D_{DMSO}}{D_{particle}} r_{DMSO} \quad (16)$$

A reference molecule for the hydrodynamic radius was used to eliminate discrepancies in the apparent diffusion coefficient due to differences in solution viscosity between samples and temperature gradients across the sample during the course of the experiment. DMSO was chosen as the reference molecule because of its known hydrodynamic radius and distinct $^1$H resonance from the capping ligand.

To address the issue of polydispersity in the nanoparticle sample, the signal intensity of the $^1$H resonances was treated as a distribution of diffusion coefficients given by the following equation:

$$\frac{I}{I_0} = \int_0^\infty P(D) \exp(-kD) \, dD \quad (17)$$

This integral is the autocorrelation function for a system described by equation 14. However, the integral represents an ill-posed problem and cannot be evaluated reliably. Many regularization techniques exist, such as CONTIN[7], which are used to invert the integral and extract a distribution that is representative of polydispersity. However, these methods are problematic because they produce a distribution without any prior knowledge of the system. The result is that small alterations in conditions tend to have a dramatic effect on the distribution output due to the ill-posed nature of the problem.

In order to circumvent this issue, a mathematical algorithm was developed and executed in MatLab R2010a, that requires an initial value for the diffusion coefficient and standard deviation. Since NMR signal intensity reflects the population distribution of an ensemble, Equation 13 provides the average diffusion coefficient for the sample, allowing explicit control of the standard deviation and probability distribution to fit the autocorrelation function from raw NMR data. The standard deviation estimate can be manipulated to best fit any distribution. In this case, a Gaussian distribution was assumed. This provides the ability to adjust the distribution to determine the most appropriate model for each system and extract a reliable standard deviation.

Impact of NP Composition on Metal Core Diameter and PL Emission Maximum.

Figure 23A:
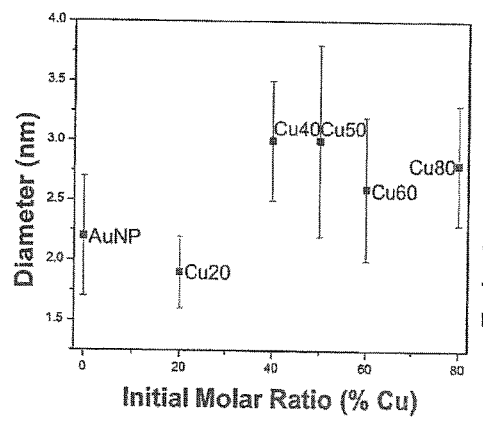
FIG. 23 shows the determining of the presence or absence of correlations between alloy nanoparticle core diameter and molar ratio Cu as determined by ICP-MS (A) and emission maximum (B).
Figure 23B:
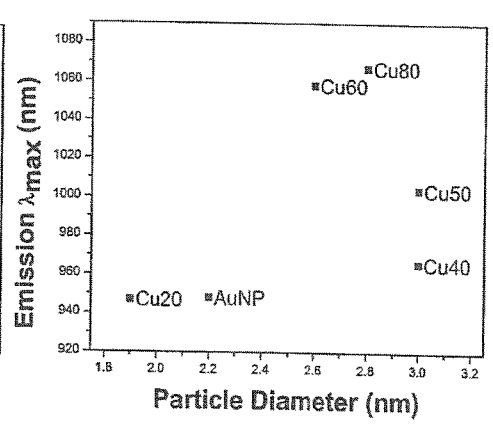

An important aspect of defining the relationship between nanoparticle composition and PL emission maxima, is decoupling the impact of nanoparticle diameter and nanoparticle composition on the resulting emissions. This may be done by analyzing these parameters in two ways. First, it was analyzed whether there is a correlation between nanoparticle composition and nanoparticle size (FIG. 23A). Here, it was found that there is no consistent relationship between the % Cu incorporated into the nanoparticle and the final nanoparticle diameter ($R^2$=0.2898). Overall, average diameters fall within the range of 1.9-3.0 nm regardless of % Cu incorporated. In a second analysis, the average particle size was compared with average emission maxima (FIG. 23B) and standard error of the measurement. If we plot particles not by average molar composition, but instead by average size vs. emission maximum, we also observe no clear relationship between average particle diameter and average emission maxima ($R^2$=0.048). This result is consistent with the current, published literature regarding PL from pure gold nanoparticles of these diameters which shows little relationship between particle diameter and particle PL emission maxima within this particle size range.

Calculation of the Molar Extinction Coefficient.

Figure 25:
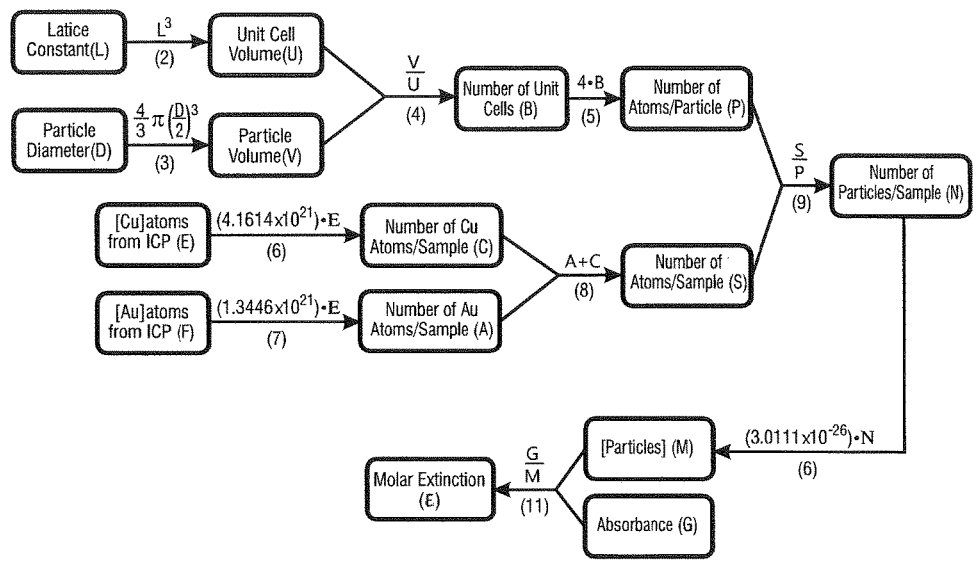
FIG. 25 is a flowchart illustrating the calculation pathway for molar extinction coefficients.

Nanoparticle extinction coefficients were calculated using the UV-vis-NIR spectrum of the NP suspension after purification but prior to dissolution in aqua regia. The concentration of the metals and molar ratios was determined by ICP-MS. Absorption values were measured at 360 nm, consistent with the excitation wavelengths used. The average diameter of the NPs was determined using HRTEM micrographs. The total number of gold atoms was estimated per particle by dividing the volume of the NP sphere by the volume of the FCC lattice calculated for each composition. FIG. 25 is a flow chart describing the calculation pathway used for determining molar extinction coefficients.

Photoluminescence Under Biologically Relevant Conditions.

Aliquots of purified NPs were diluted with a buffered solution consisting of 20 mM HEPES (Acros, $C_8H_{18}O_4N_2S$, 99%) at a pH of 7.2 and ionic strength (I) of 0.10 M using sodium chloride (EMD, >99%). The diluted NP solutions were compared to samples diluted using only water (Figure).

Figure 26A:
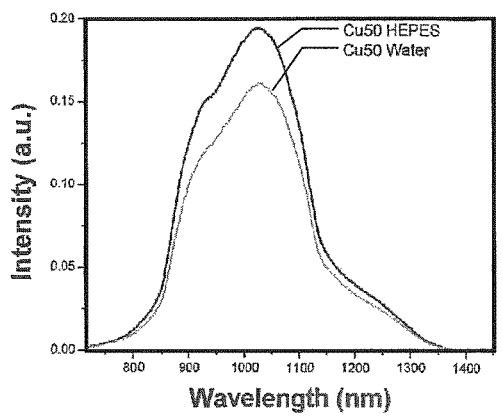
FIG. 26 shows emission spectra of Cu20 NPs in NANOpure water and in buffer solution (0.020 M HEPES pH=7.2, I=0.10 M NaCl) (A) and relative changes in the $\Phi$ for $Au_xCu_y$ NPs of compositions 0% to 60% Cu in buffer relative to NANOpure water (B) ($\lambda_{EX}=360\pm14.5$ nm, $\lambda_{EM}$ slit width of 10 nm) according to preferred aspects of the present disclosure.
Figure 26B:
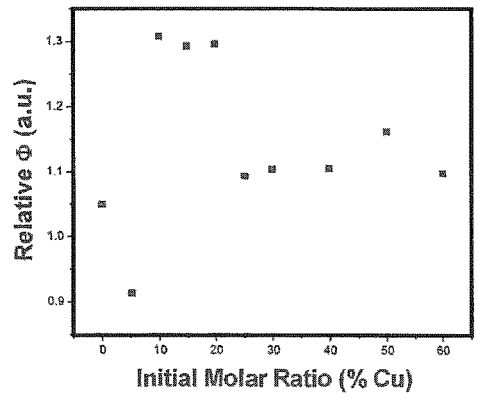

FIGS. 26A and FIG. 26B show emission spectra of Cu20 NPs in NANOpure water and in buffer solution (0.020 M HEPES pH=7.2, I=0.10 M NaCl) (A) and relative changes in the Φ for $Au_xCu_y$ NPs of compositions 0% to 60% Cu in buffer relative to NANOpure water (B) ($\lambda_{EX}$=360±14.5 nm, $\lambda_{EM}$ slit width of 10 nm).

It will be seen that the techniques described herein provide a basis for improved production of metal alloy nanoparticles. The terms and expressions employed herein are used as terms of description and not of limitation, and there is no intention in the use of such terms and expressions as excluding any equivalents of the features shown and described or portions thereof. Instead, it is recognized that various modifications are possible within the scope of the claims hereof.

What is claimed is:

1. A method for producing small metal alloy nanoparticles of a first metal and a second metal, comprising:
   mixing, at room temperature in air, a first aqueous solution of first and second metal nanoparticle precursor species in a first molar ratio of the first metal to the second metal;
   mixing a separate organic ligand into the first aqueous solution;
   adding a reducing agent to the first aqueous solution; and
   aging the first aqueous solution for a first period of at least about one hour to produce metal alloy nanoparticles having a diameter ranging from about 1.8 nm to about 3 nm.

2. The method of claim 1 further comprising: characterizing the elemental composition of the metal alloy nanoparticles from the first aqueous solution by one or more measurements of photoluminescence, inductively coupled plasma mass spectrometry (ICP-MS), X-ray photoelectron spectroscopy (XPS) and energy dispersive X-ray spectroscopy (EDS) of the nanoparticles.

3. The method of claim 1 wherein the first metal nanoparticle precursor species comprises gold(III) chloride trihydrate (HAuCl4 3H2O), the second metal nanoparticle precursor species comprises copper(II) nitrate hemipentahydrate (Cu(NO3)2 5H2O), the organic ligand comprises poly(ethylene glycol) methyl ether thiol and the reducing agent comprises sodium borohydride (NaBH4).

4. The method of claim 1 wherein the first metal nanoparticle precursor species comprises gold(III) chloride trihydrate (HAuCl4 3H2O), the second metal nanoparticle precursor species comprises silver nitrate (AgNO3), the organic ligand comprises poly(ethylene glycol) methyl ether thiol and the reducing agent comprises sodium borohydride (NaBH4).

5. The method of claim 1 wherein each of the first and second metals is selected from the group consisting of gold, copper, silver, cobalt, nickel, iron and zinc.

6. The method of claim 1 wherein the metal alloy nanoparticles comprise an alloy combination selected from the group consisting of Au—Co, Au—Ni, Au—Cu, Au—Fe, Au—Ag and Au—Zn.

7. The method of claim 1 further comprising:
   mixing, at room temperature in air, a second aqueous solution of the first and second metal nanoparticle precursor species in a second molar ratio of the first metal to the second metal;
   mixing the separate organic ligand into the second aqueous solution;
   adding the reducing agent to the second aqueous solution; and
   aging the second aqueous solution for the first period of at least about one hour to produce metal alloy nanoparticles having a diameter ranging from about 1.8 nm to about 3 nm.

8. The method of claim 7 further comprising:
   characterizing the elemental composition of the metal alloy nanoparticles from the second aqueous solution by one or more measurements of photoluminescence inductively coupled plasma mass spectrometry (ICP-MS), X-ray photoelectron spectroscopy (XPS) and energy dispersive X-ray spectroscopy (EDS) of the nanoparticles; and
   comparing the measurements of the metal alloy nanoparticles from the first and second aqueous solutions, respectively.

9. A method for producing small metal alloy nanoparticles having increased photoluminescence in near infrared region comprising:
   mixing, at room temperature in air, a plurality of aqueous solutions of first and second metal nanoparticle precursor species, wherein each of the plurality of solutions contains a different molar ratio of the first metal to the second metal;
   mixing a separate organic ligand into each of the aqueous solutions;
   reducing each of the solutions by addition of a reducing agent; and
   aging the reduced solutions for a first period of at least about one hour to produce metal alloy nanoparticles having a diameter ranging from about 1.8 nm to about 3 nm.

10. The method of claim 9 further comprising: characterizing by photoluminescence measurements the elemental compositions of the resultant metal alloy nanoparticles produced from each of the plurality of aqueous solutions of different molar ratios of the first and second metals.

11. The method of claim 9 wherein the first metal nanoparticle precursor species comprises gold(III) chloride trihydrate ($HA_uCl_4$ $3H_2O$), the second metal nanoparticle precursor species comprises copper(II) nitrate hemipentahydrate ($Cu(NO_3)_2$ 5H2O), the organic ligand comprises poly(ethylene glycol) methyl ether thiol and the reducing agent comprises sodium borohydride ($NaBH_4$).

12. The method of claim 9 wherein the first metal nanoparticle precursor species comprises gold(III) chloride trihydrate ($HA_uCl_4$ $3H_2O$), the second metal nanoparticle precursor species comprises silver nitrate ($AgNO_3$), the organic ligand comprises poly(ethylene glycol) methyl ether thiol and the reducing agent comprises sodium borohydride ($NaBH_4$).

13. The method of claim 9 wherein each of the first and second metals is selected from the group consisting of gold, copper, silver, cobalt, nickel, iron and zinc.

14. The method of claim 9 wherein the metal alloy nanoparticles comprise an alloy combination selected from the group consisting of Au—Co, Au—Ni, Au—Cu, Au—Fe, Au—Ag and Au—Zn.

* * * * *